United States Patent
Patel

(10) Patent No.: US 12,455,700 B2
(45) Date of Patent: Oct. 28, 2025

(54) INCREASED SHIFT FREQUENCY FOR MULTI-CHIP-MODULE SCAN

(71) Applicant: Advanced Micro Devices, Inc., Santa Clara, CA (US)

(72) Inventor: Nehal Patel, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 285 days.

(21) Appl. No.: 18/194,390

(22) Filed: Mar. 31, 2023

(65) Prior Publication Data

US 2025/0208779 A1  Jun. 26, 2025

(51) Int. Cl.
*G06F 3/06* (2006.01)
*G06F 1/06* (2006.01)

(52) U.S. Cl.
CPC .......... *G06F 3/0647* (2013.01); *G06F 1/06* (2013.01); *G06F 3/0604* (2013.01); *G06F 3/0683* (2013.01)

(58) Field of Classification Search
CPC .................................................. G06F 3/0647
See application file for complete search history.

(56) References Cited

U.S. PATENT DOCUMENTS

| | | | | |
|---|---|---|---|---|
| 4,176,400 A | * | 11/1979 | Heckel | G06F 5/06 |
| | | | | 713/502 |
| 4,926,424 A | * | 5/1990 | Maeno | G01R 31/318547 |
| | | | | 714/719 |
| 5,032,985 A | * | 7/1991 | Curran | G06F 12/0817 |
| | | | | 711/E12.027 |
| 8,495,443 B1 | * | 7/2013 | Yu | G01R 31/318588 |
| | | | | 714/730 |
| 9,600,018 B1 | * | 3/2017 | Majumdar | G06F 1/06 |
| 2020/0051961 A1 | * | 2/2020 | Rickard | H01L 23/5385 |
| 2020/0105718 A1 | * | 4/2020 | Collins | H01L 25/0655 |

* cited by examiner

*Primary Examiner* — Douglas King
(74) *Attorney, Agent, or Firm* — Greenberg Traurig, LLP

(57) ABSTRACT

The disclosed device includes an input, an output and multiple flops serially connected between the input and the output. The device also includes a bypass circuit coupled to the input and the output and a control circuit. The control circuit can enable, in response to a first trigger, the flops to shift data to the output. In response to a second trigger, the control circuit can disable the flops and enable the bypass circuit to shift data from the input to the output. The flops can be part of a chain of flops. Various other methods, systems, and computer-readable media are also disclosed.

20 Claims, 9 Drawing Sheets

INCREASED SHIFT FREQUENCY FOR MULTI-CHIP-MODULE SCAN

BACKGROUND

When debugging computing hardware, reading a state of the hardware at a time of hardware error can provide useful information for debugging and analysis. A scan dump operation allows reading a hardware component's internal state (e.g., data being processed) at the time of hardware error. The hardware component can perform the scan dump operation by shifting data through its flops, which are serially connected to a debug output. Each flop sends its currently held data to the next flop, until data from the last flop in the series has been output.

Hardware architectures for systems-on-chip (SOC) increasingly utilize multiple chips or chiplets in a multi-chip-module (MCM) architecture. For scan dump purposes, the various chiplets can be serially connected such that the flops of all the chiplets can be connected in one large chain.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
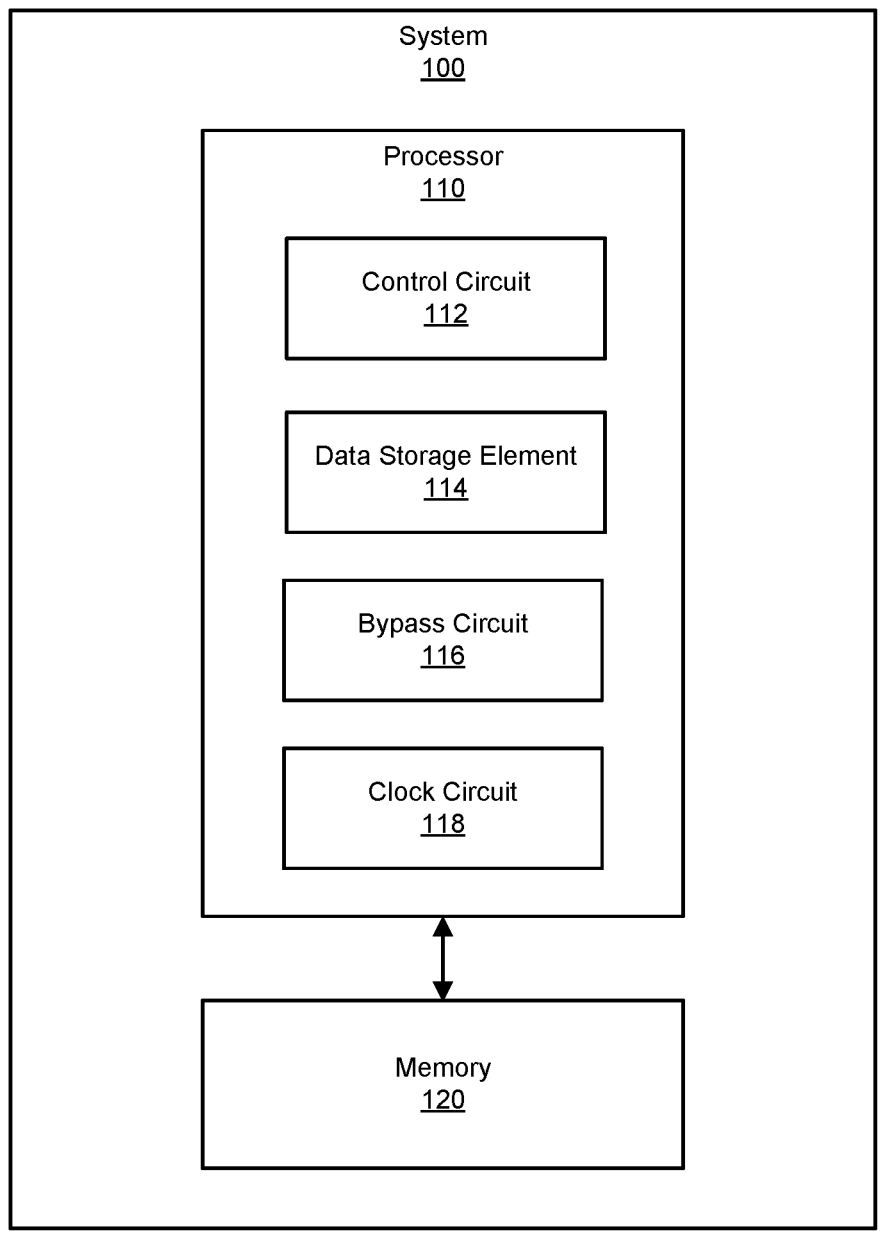
FIG. 1 is a block diagram of an exemplary system for increased shift frequency for multi-chip-module scan.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to increased shift frequency for multi-chip-module scan. As will be explained in greater detail below, implementations of the present disclosure allow for shifting data through a chain of data storage elements (e.g., flops) of serially connected devices (e.g., chiplets). Specific triggers for each device allow the triggered device to shift data to its output and when it completes flushing its data elements, enabling a bypass circuit for passing through data received from another device connected to its input. By enabling each device one at a time during a scan dump, the systems and methods provided herein can reduce power consumption and heat generation for a scan dump, further allowing an increased shift frequency for the scan dump.

In one implementation, a device for increased shift frequency for multi-chip-module scan includes an input and an output, a plurality of data storage elements serially connected between the input and the output, a bypass circuit coupled to the input and the output, and a control circuit. The control circuit is configured to (i) enable, in response to a first trigger, the plurality of data storage elements to shift data through the plurality of data storage elements to the output, (ii) enable, in response to a second trigger, the bypass circuit to shift data from the input to the output and (iii) disable, in response to the second trigger, the plurality of data storage elements. The plurality of data storage elements can comprise a portion of a chain of data storage elements.

In some examples, the first trigger can be based on a number of data storage elements preceding the output in the chain of data storage elements. In some examples, the second trigger can be based on a number of data storage elements in the plurality of data storage elements.

In some examples, the control circuit can include a multiplexer for selecting between the plurality of data storage elements and the bypass circuit. In some examples, the bypass circuit can include a data storage element for holding data shifted from the input to the output.

In one implementation, a system for increased shift frequency for multi-chip-module scan includes a clock circuit for timing clock cycles, and a plurality of chiplets. Each chiplet can include an input and an output, the chiplet coupled to at least one other chiplet via the input or the output, a plurality of data storage elements serially connected between the input and the output, a bypass circuit coupled to the input and the output, and a control circuit configured to (i) enable, in response to a first trigger, the plurality of data storage elements to shift data through the plurality of data storage elements to the output based on clock cycles, (ii) enable, in response to a second trigger, the bypass circuit to shift data from the input to the output based on the clock cycles, and (iii) disable, in response to the second trigger, the plurality of data storage elements. Each plurality of data storage elements can comprise a portion of a chain of data storage elements.

In some examples, for each chiplet, the control circuit can include a counter for tracking the clock cycles from a start of a scan dump. In some examples, for each chiplet, the first trigger can be based on the counter reaching a clock cycle count value corresponding to a number of data storage elements preceding the output in the chain of data storage elements.

In some examples, for each chiplet, the clock cycle count value can include a transition cycle. In some examples, for each chiplet, during the transition cycle the bypass circuit can receive data from the input and a last of the plurality of data storage elements transmits data to the output.

In some examples, for each chiplet, the second trigger can be based on the counter reaching a clock cycle count value corresponding to a number of data storage elements in the plurality of data storage elements.

In some examples, for each chiplet, the control circuit can include a clock gate circuit. In some examples, for each chiplet, the control circuit can be configured to disable the plurality of data storage elements by using the clock gate circuit to block a clock signal from the clock circuit to the plurality of data storage elements.

In some examples, for each chiplet, the control circuit can include a multiplexer for selecting between the plurality of data storage elements and the bypass circuit. In some examples, for each chiplet, the bypass circuit can include a data storage element for holding data shifted from the input to the output.

In some examples, for each chiplet, the bypass circuit can receive, via the input, data from a second portion of the chain of data storage elements succeeding the chiplet In one example, a method for increased shift frequency for multi-chip-module scan includes (i) initializing a counter of a chiplet, (ii) enabling, in response to a first trigger, a plurality of data storage elements of the chiplet to shift data through the plurality of data storage elements to an output of the chiplet, wherein the plurality of data storage elements are serially connected between an input of the chiplet and the output and comprise a portion of a chain of data storage elements, (iii) receiving, via a bypass circuit of the chiplet connected to the input and the output, data from the input, (iv) enabling, in response to a second trigger, the bypass circuit to shift data from the input to the output, and (v) disabling, in response to the second trigger, the plurality of data storage elements.

In some examples, initializing the counter can further include storing, for the first trigger, a first clock cycle count value corresponding to a number of data storage elements preceding the output in the chain of data storage elements and storing, for the second trigger, a second clock cycle count value corresponding to a number of data storage elements in the plurality of data storage elements.

In some examples, receiving, via the bypass circuit, the data from the input can further include receiving, from a second portion of the chain of data storage elements succeeding the chiplet, the data from the input. In some examples, receiving, via the bypass circuit, the data from the input can further include receiving, during a transition cycle, the data from the input.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-5, detailed descriptions of increased shift frequency for multi-chip-module scan. Detailed descriptions of example systems will be provided in connection with FIGS. 1-3. Detailed descriptions of various states during a scan dump for a multi-chip module will be provided in connection with FIGS. 4A-4E. Detailed descriptions of corresponding computer-implemented methods will also be provided in connection with FIG. 5.

FIG. 1 is a block diagram of an example system 100 for increased shift frequency for multi-chip-module scan. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a data storage element 114, a bypass circuit 116, and a clock circuit 118. Control circuit 112 corresponds to a circuitry for coordinating a scan dump operation for processor 110, as described further herein. Data storage element 114 corresponds to a local storage of processor 110 and in some examples can correspond to multiple iterations of a single data unit (e.g., a flop) such that processor 110 can include multiple flops. Bypass circuit 116 corresponds to a circuit for passing data and in some examples can have a data storage element (e.g., a flop) for temporarily holding data. Clock circuit 118 corresponds to a reference clock for sending clock signals. Certain components can synchronize based on the clock signals, such as data storage element 114.

Figure 2:
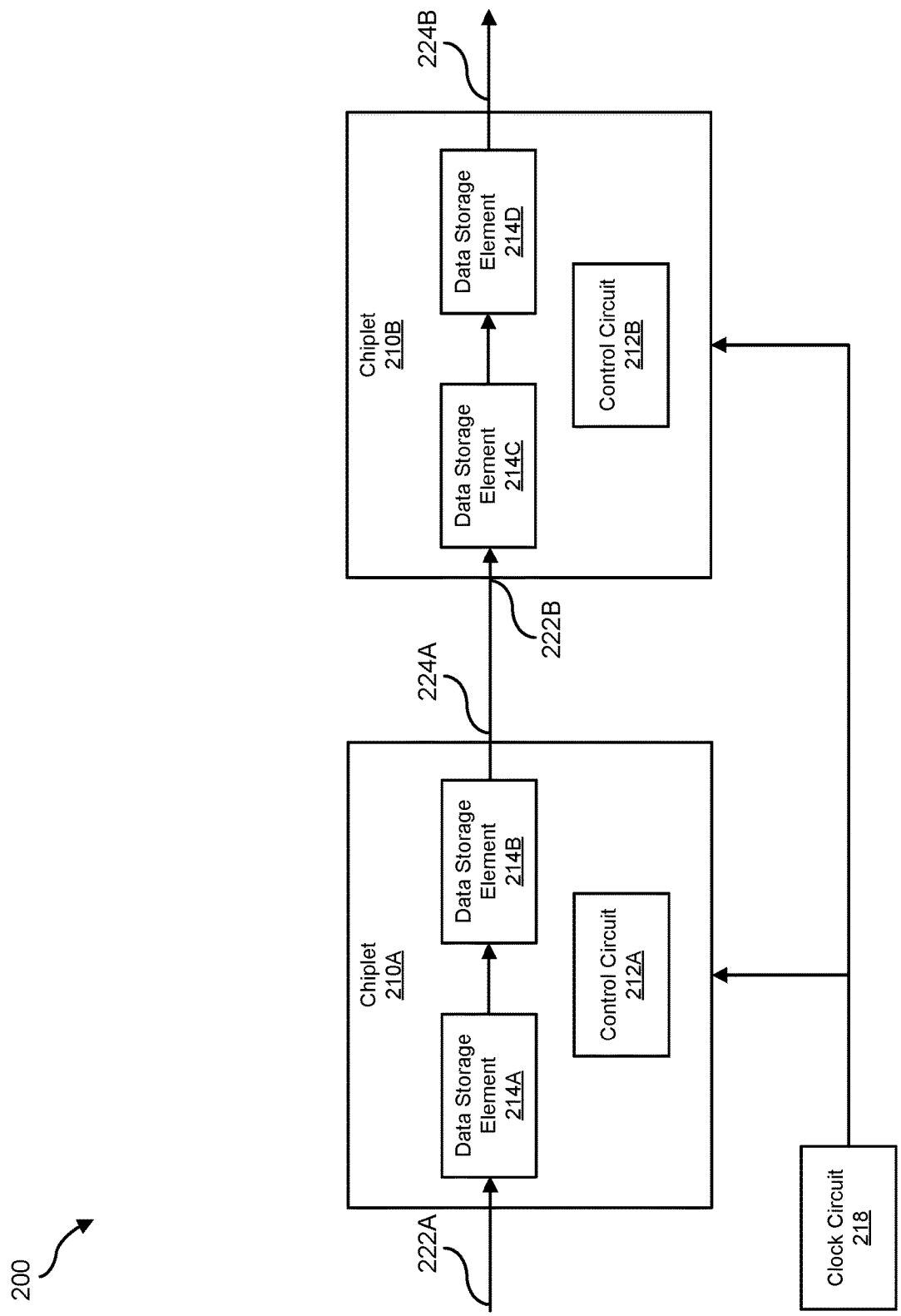
FIG. 2 is a block diagram of an exemplary multi-chip module.

FIG. 2 illustrates an example MCM 200. MCM 200 includes a chiplet 210A which corresponds to an iteration of processor 110, a chiplet 210B which corresponds to an iteration of processor 110, and a clock circuit 218 which corresponds to clock circuit 118. Chiplet 210A includes a data storage element 214A which corresponds to an iteration of data storage element 114, a data storage element 214B which corresponds to an iteration of data storage element 114, and a control circuit 212A which corresponds to an iteration of control circuit 112. Chiplet 210B includes a data storage element 214C which corresponds to an iteration of data storage element 114, a data storage element 214D which corresponds to an iteration of data storage element 114, and a control circuit 212B which corresponds to an iteration of control circuit 112. As further illustrated in FIG. 2, chiplet 210A includes an input 222A and an output 224A, and chiplet 210B includes an input 222B and an output 224B. FIG. 2 illustrates a simplified example of an MCM. In other examples, MCM 200 can include additional components (e.g., additional chiplets, each chiplet having additional data storage elements, etc.).

The inputs and output illustrated in FIG. 2 (e.g., input 222A, output 224A, input 222B, and output 224B) can correspond to a debug interface for outputting data such as for a scan dump operation. As illustrated in FIG. 2, chiplet 210A and chiplet 210B are connected serially via output 224A and input 222B. More specifically, the data storage elements (e.g., data storage element 214A, data storage element 214B, data storage element 214C, and data storage element 214D) form a chain of data storage elements that are serially connected. Input 222A can, in some examples, be connected to another device (e.g., another chiplet) having data storage elements as part of the chain of data storage elements. Output 224B can, in some examples, be connected to another device (e.g., another chiplet) having data storage elements as part of the chain of data storage elements, although in other examples output 224B can be connected to a debug output.

During the scan dump, data can be shifted down the chain to output 224B. For example, in a first cycle of the scan dump, data stored in data storage element 214D can be output to output 224B, data stored in data storage element 214C can be shifted to data storage element 214D, data stored in data storage element 214B can be shifted (via output 224A and input 22B) to data storage element 214C, data stored in data storage element 214A can be shifted to data storage element 214B, and if data is received from input 222A, the received data can be shifted to data storage element 214A. Each successive cycle (timed by clock circuit 218) can shift data such that outputting all of the data held in the chain of data storage elements can require a number of cycles corresponding to a total number of data storage elements in the chain of data storage elements (e.g., four in FIG. 2).

As the total number of data storage elements increases, the scan dump operation can become an increasingly resource-intensive operation. For example, the total number of data storage elements can number in millions, requiring a corresponding number of cycles. In addition, because every data storage element is active (e.g., toggled) for every cycle, the power requirements increase. The power consumption can increase further increasing heat and other performance hits can reduce a frequency of the scan dump operation (e.g., slowing down a frequency of cycles).

Figure 3:
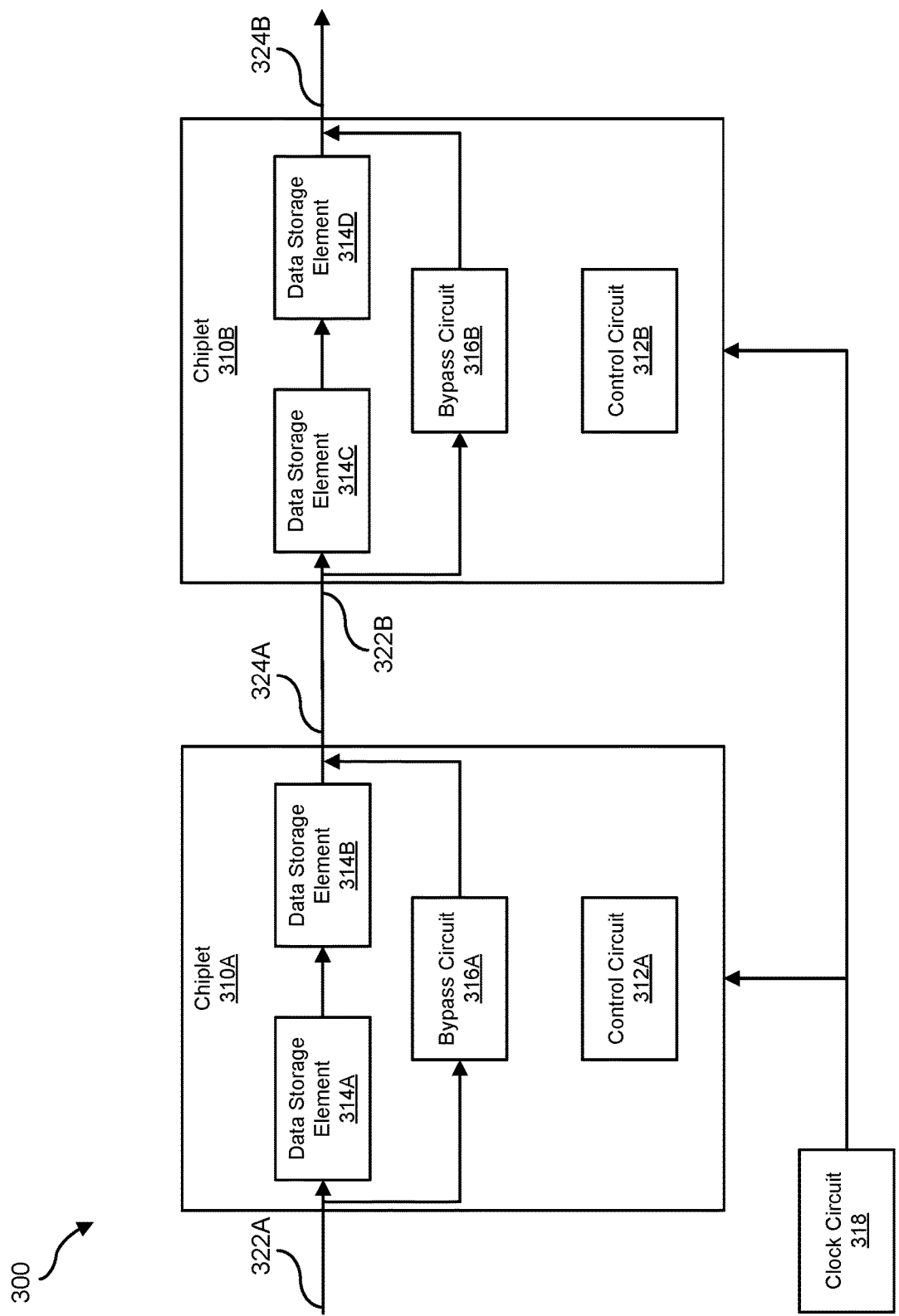
FIG. 3 is a block diagram of an exemplary multi-chip module with an increased shift frequency for a scan.

FIG. 3 illustrates an example MCM 300. MCM 300 includes a chiplet 310A which corresponds to an iteration of processor 110, a chiplet 310B which corresponds to an iteration of processor 110, and a clock circuit 318 which corresponds to clock circuit 118. Chiplet 310A includes a data storage element 314A which corresponds to an iteration of data storage element 114, a data storage element 314B which corresponds to an iteration of data storage element 114, a bypass circuit 316A which corresponds to an iteration of bypass circuit 116, and a control circuit 312A which corresponds to an iteration of control circuit 112. Chiplet 310B includes a data storage element 314C which corresponds to an iteration of data storage element 114, a data storage element 314D which corresponds to an iteration of data storage element 114, a bypass circuit 316B which corresponds to an iteration of bypass circuit 116, and a control circuit 312B which corresponds to an iteration of control circuit 112. As further illustrated in FIG. 3, chiplet 310A includes an input 322A and an output 324A, and chiplet 310B includes an input 322B and an output 324B. FIG. 3 illustrates a simplified example of an MCM. In other examples, MCM 300 can include additional components (e.g., additional chiplets, each chiplet having additional data storage elements, etc.).

Similar to MCM 200 in FIG. 2, MCM 300 includes a chain of data storage elements (e.g., data storage element 314A, data storage element 314B, data storage element 314C, and data storage element 314D) formed by serially connecting chiplets (e.g., chiplet 310A and chiplet 310B via output 324A and input 322B and further connected via input 322A and output 324B). However, in contrast to FIG. 2, chiplet 310A includes bypass circuit 316A controlled by control circuit 312A and chiplet 310B includes bypass circuit 316B controlled by control circuit 312B.

For a given chiplet, the corresponding control circuit can enable the data storage elements to shift data in response to a first trigger and disable the data storage elements and enable the bypass circuit to shift data from the input to the output in response to a second trigger. The first trigger can correspond to a number of data storage elements preceding the chiplet (e.g., for counting a corresponding number of cycles before shifting data), and the second trigger can correspond to a number of data storage elements in the chiplet (e.g., for counting a corresponding number of cycles to complete shifting data).

For instance, at the beginning of a scan dump operation, control circuit 312B can instruct data storage element 314C and data storage element 314D to begin shifting data after data storage elements preceding output 324B (e.g., zero in FIG. 3) complete shifting data after a corresponding number of cycles. Data storage element 314C and data storage element 314D can complete shifting their data to output 324B after two cycles (e.g., corresponding to the number of data storage elements in chiplet 310B). After two cycles, control circuit 312B can disable the data storage elements and enable bypass circuit 316B. Bypass circuit 316B can receive data from input 322B and output directly to output 324B without requiring shifting data through the data storage elements.

Similarly, at the beginning of the scan dump operation, control circuit 312A can instruct data storage element 314A and data storage element 314B to begin shifting data after data storage elements preceding output 324B (e.g., two in FIG. 3) complete shifting data after a corresponding number of cycles. Data storage element 314A and data storage element 314B can shift data to chiplet 310B (and more specifically to bypass circuit 316B) via output 324A, and can complete shifting their data to output 324A after two cycles (e.g., corresponding to the number of data storage elements in chiplet 310A). After two cycles, control circuit 312A can disable the data storage elements and enable bypass circuit 316A. Bypass circuit 316A can receive data (if any) from input 322A and output directly to output 324A without requiring shifting data through the data storage elements.

Accordingly, the data storage elements of a given chiplet can be selectively enabled when preceding chiplets have completed such that a number of active data storage elements during a cycle can be greatly reduced from the total number of data storage elements in the chain of data storage elements. Because the chiplets are connected serially, the respective bypass circuits allow data to be shifted through chiplets without having to shift through every data storage element.

In some implementations, to ensure that the bypass circuits can shift data without a gap, the trigger conditions can be adjusted to allow for a transition cycle in which a bypass circuit is enabled one cycle before the respective data storage elements finish shifting data, in order to receive data from the next or succeeding chiplet/data storage element, as will be described further below. However, in other implementations, the bypass circuit can connect the last data storage element (e.g., closest to the input of the chiplet) directly to the output such that the transition cycle is not needed.

FIG. 4A-4E illustrate an example MCM 400 which can correspond to MCM 300. MCM 400 includes a chiplet 410A which corresponds to an iteration of processor 410, a chiplet 410B which corresponds to an iteration of processor 110, and a clock circuit 418 which corresponds to clock circuit 118. Chiplet 410A includes a data storage element 414A which corresponds to an iteration of data storage element 114, a data storage element 414B which corresponds to an iteration of data storage element 114, a data storage element 414C which corresponds to an iteration of data storage element 114, a bypass circuit 416A which corresponds to an iteration of bypass circuit 116, and a control circuit 412A which corresponds to an iteration of control circuit 112. Control circuit 412A includes a gate 428A and a counter 426A. Chiplet 410B includes a data storage element 414D which corresponds to an iteration of data storage element 114, a data storage element 414E which corresponds to an iteration of data storage element 114, a data storage element 414F which corresponds to an iteration of data storage element 114, a bypass circuit 416B which corresponds to an iteration of bypass circuit 116, and a control circuit 412B which corresponds to an iteration of control circuit 112. Control circuit 412B includes a gate 428B and a counter 426B. As further illustrated in FIG. 4, chiplet 410A includes an input 422A and an output 424A, and chiplet 410B includes an input 422B and an output 424B. FIG. 4 illustrates a simplified example of an MCM. In other examples, MCM 400 can include additional components (e.g., additional chiplets, each chiplet having additional data storage elements, etc.).

Figure 4A:
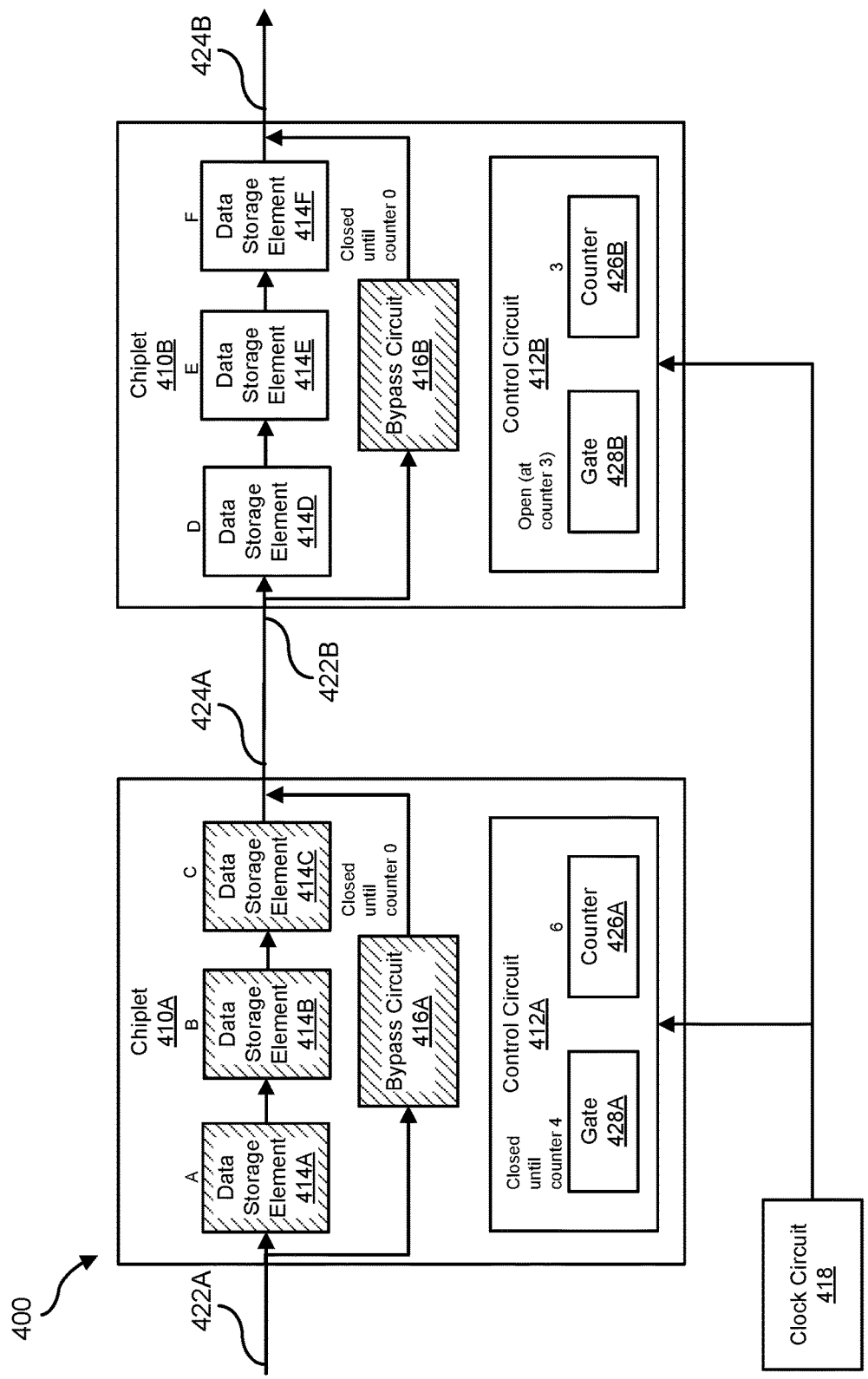
FIGS. 4A-4E illustrate various cycles during a multi-chip-module scan with increased shift frequency.

FIG. 4A illustrates an initial cycle of a scan dump operation, which can include initializing of counters. Each data storage element can hold its own data value (e.g., data storage element 414A holds value "A," data storage element 414B holds value "B," data storage element 414C holds value "C," etc.) and together form a chain of data storage elements (e.g., starting with data storage element 414F and ending with data storage element 414A). Each counter (e.g., counter 426A and counter 426B) can correspond to a countdown counter which can be initialized with a start value, decrement the value each cycle, and saturates (e.g., reaches value "0"). In FIG. 4A, chiplet 410B is the first chiplet connected to the debug output (e.g., along output 424B) such that its data storage elements (e.g., data storage element 414F, data storage element 414E, and data storage element 414D) are the first data storage elements to shift data out. Accordingly, the counter for chiplet 410B (e.g., counter 426B) can be initialized to a value of "3" corresponding to the number of data storage elements in chiplet 410B (e.g., 3).

In FIG. 4A, chiplet 410A is the second chiplet to output data, such that the data in its data storage elements (e.g., data storage element 414C, data storage element 414B, and data storage element 414A) can shift their data out after the data storage elements of chiplet 410B. Accordingly, the counter for chiplet 410A (e.g., counter 426A) can be initialized to a value of "6" corresponding to a number of data storage elements in chiplet 410A (e.g., 3) plus a number data storage elements preceding chiplet 410A in the chain of data storage elements (e.g., 3).

Gate 428A and gate 428B can correspond to clock gate circuits that can gate (e.g., allow or block) a clock signal from clock circuit 418. Gate 428A can be used for enabling the data storage elements 414A-414C (e.g., by opening/allowing the clock signal to reach the data storage elements 414A-414C) and disabling the data storage elements 414A-414C (e.g. by closing/blocking the clock signal from reaching data storage elements 414A-414C). Similarly, gate 428B can be used for enabling/disabling the data storage elements 414D-414F. Thus, the clock gate circuits can be used for enabling data storage elements for a particular chiplet when it is that particular chiplet's turn for outputting data (e.g., when all preceding chiplets in the chain have outputted data), and to disable the data storage elements otherwise.

Gate 428A and gate 428B can each be configured to be closed until a trigger counter value is reached (e.g., opening when the respective counter reaches the value), and to close again when the counter saturates. For chiplet 410B, gate 428B can be configured to open when counter 426B is at "3," coinciding with the initial value because chiplet 410B is the first chiplet in the chain. For chiplet 410A, gate 428A can be configured to open when counter 426A reaches "4," which corresponds to the number of cycles for preceding data storage elements (e.g., 3) plus 1 (for a transition cycle as will be described further below) after the initial counter value. In other words, the initial counter value (which is 6 by adding the 3 preceding data storage elements with the 3 data storage elements of chiplet 410A) minus a number of wait cycles (which is 4 by subtracting a transition cycle from a number of cycles for preceding data storage elements) determines the trigger value. Alternatively, the trigger value can be a number of data storage elements of the chiplet plus one (for the transition cycle).

Control circuit 412A can enable/disable bypass circuit 416A by allowing or blocking an output of bypass circuit 416A. Similarly, control circuit 412B can enable/disable bypass circuit 416B. Although not explicitly shown in FIG. 4A, each of control circuit 412A and control circuit 412B can include or be connected to a multiplexer connected to outputs of bypass circuit 416A and data storage element 414C, and bypass circuit 416B and data storage element 414F, respectively, to allow one output. The multiplexers can be configured to close outputs of the bypass circuits until the corresponding counters saturate (e.g., reach 0).

As illustrated in FIG. 4A, for the initial cycle, in chiplet 410B, gate 428B is open (e.g., data storage elements 414D-414F are enabled) while bypass circuit 416B is disabled (e.g., the mux is closed for bypass circuit 416B) as indicated by the shaded box. For the initial cycle, in chiplet 410A, gate 428A is closed (e.g., data storage elements 414A-414C are disabled as indicated by the shaded boxes) and bypass circuit 416A is also disabled (e.g., the mux is closed for bypass circuit 416A). Thus, data storage elements 414D-414F can shift data while data storage elements 414A-414C are disabled.

Figure 4B:
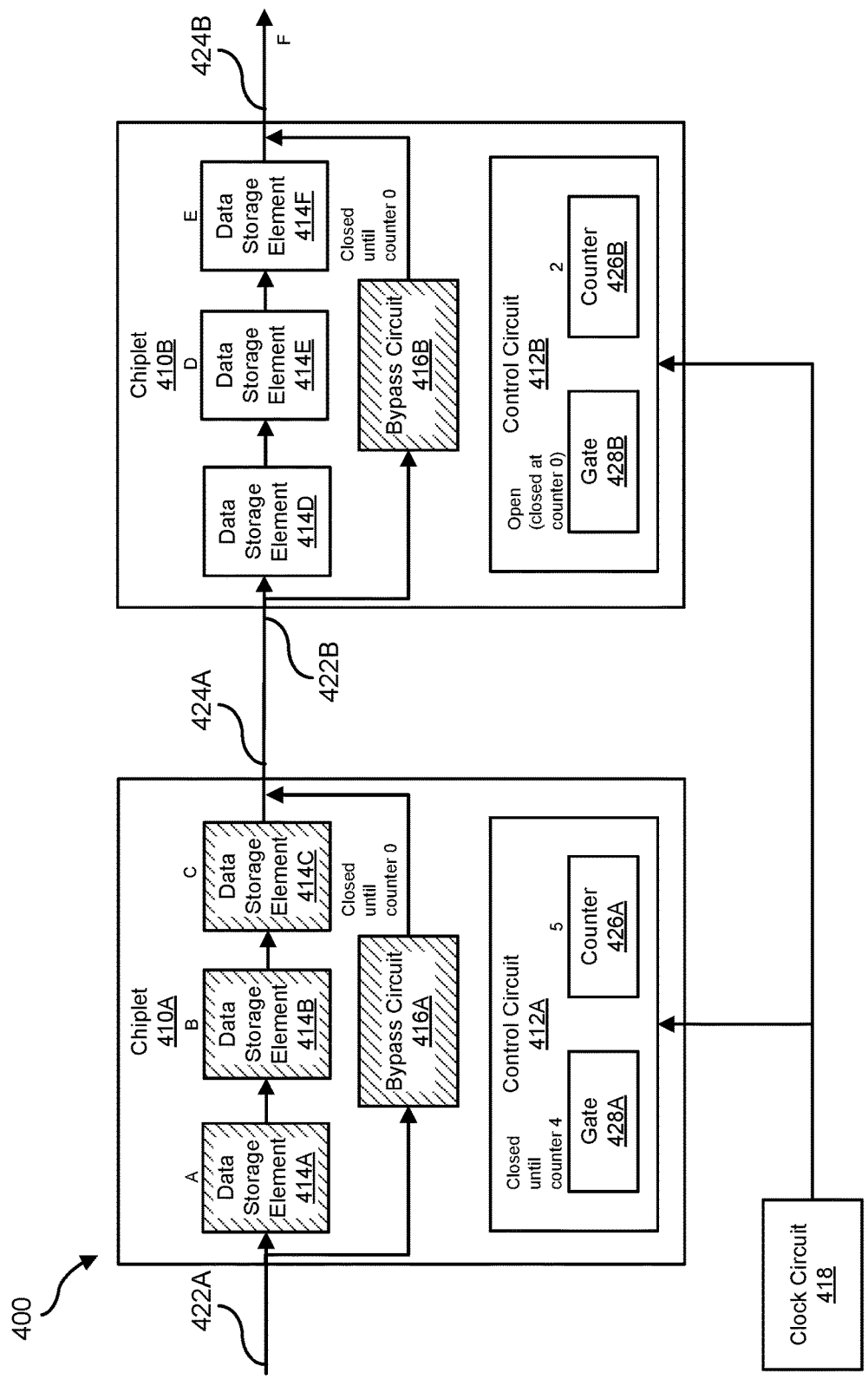

Turning to FIG. 4B, FIG. 4B corresponds to a next cycle, with counter 426A and counter 426B having decremented their values (e.g., to "5" and "2," respectively). Data storage elements 414D-414F have shifted their values such that value "F" formerly stored by data storage element 414F is shifted to output 424B, data storage element 414F now holds value "E" from data storage element 414E, and data storage element 414E now holds value "D" from data storage element 414D. In contrast to, for example, FIG. 2, data storage element 414D does not receive data from succeeding data storage elements in the chain of data storage elements (e.g., from data storage element 414C) because they are currently disabled. As such, only a portion of the data storage elements in the chain of data storage elements, rather than the whole chain, is currently active, which reduces power consumption and further allows a faster clock frequency.

Figure 4C:
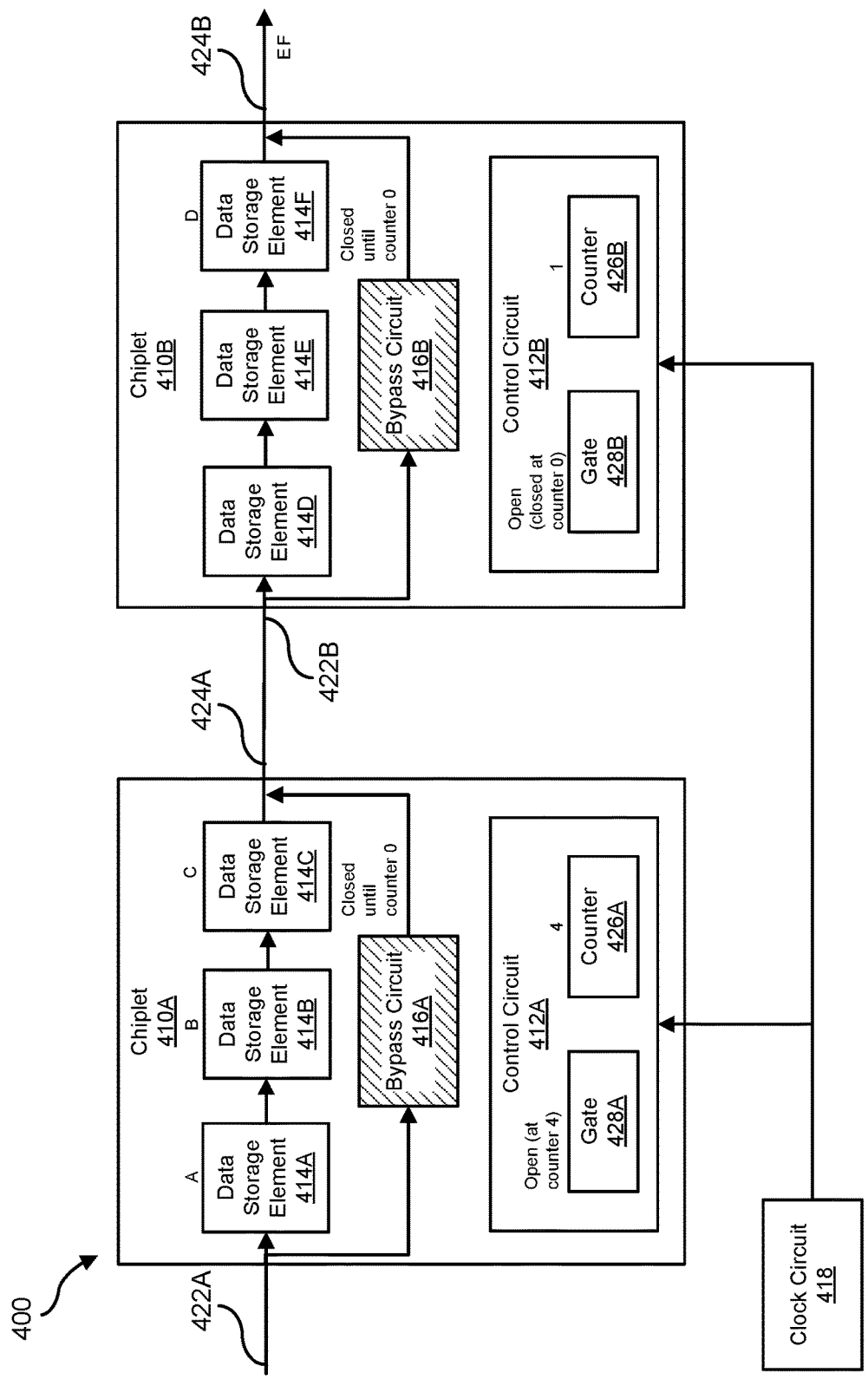

FIG. 4C illustrates a next cycle after FIG. 4B, with counter 426A and counter 426B having decremented their values (e.g., to "4" and "1," respectively). Data storage elements 414D-414F have further shifted data (e.g., values "E" and "F" have been shifted to output 424B). FIG. 4C further corresponds to a transition cycle. Gate 428A of chiplet 410A has reached its trigger value (e.g., 4) to enable data storage elements 414A-414C to start shifting data to output 424A. During the transition cycle, data storage elements of neighboring chiplets can be active, rather than the data storage elements of a single chiplet, to allow the transition. By shifting data one cycle early (e.g., one cycle before data storage elements 414D-414F complete shifting their data), the data from chiplet 410A can be loaded into bypass circuit 416B such that for the next cycle, bypass circuit 416B can begin outputting data without a gap cycle. For instance, data storage element 414C can now shift its data to output 424A, which is connected to input 422B of chiplet 410B, and further connected to bypass circuit 416B.

Figure 4D:
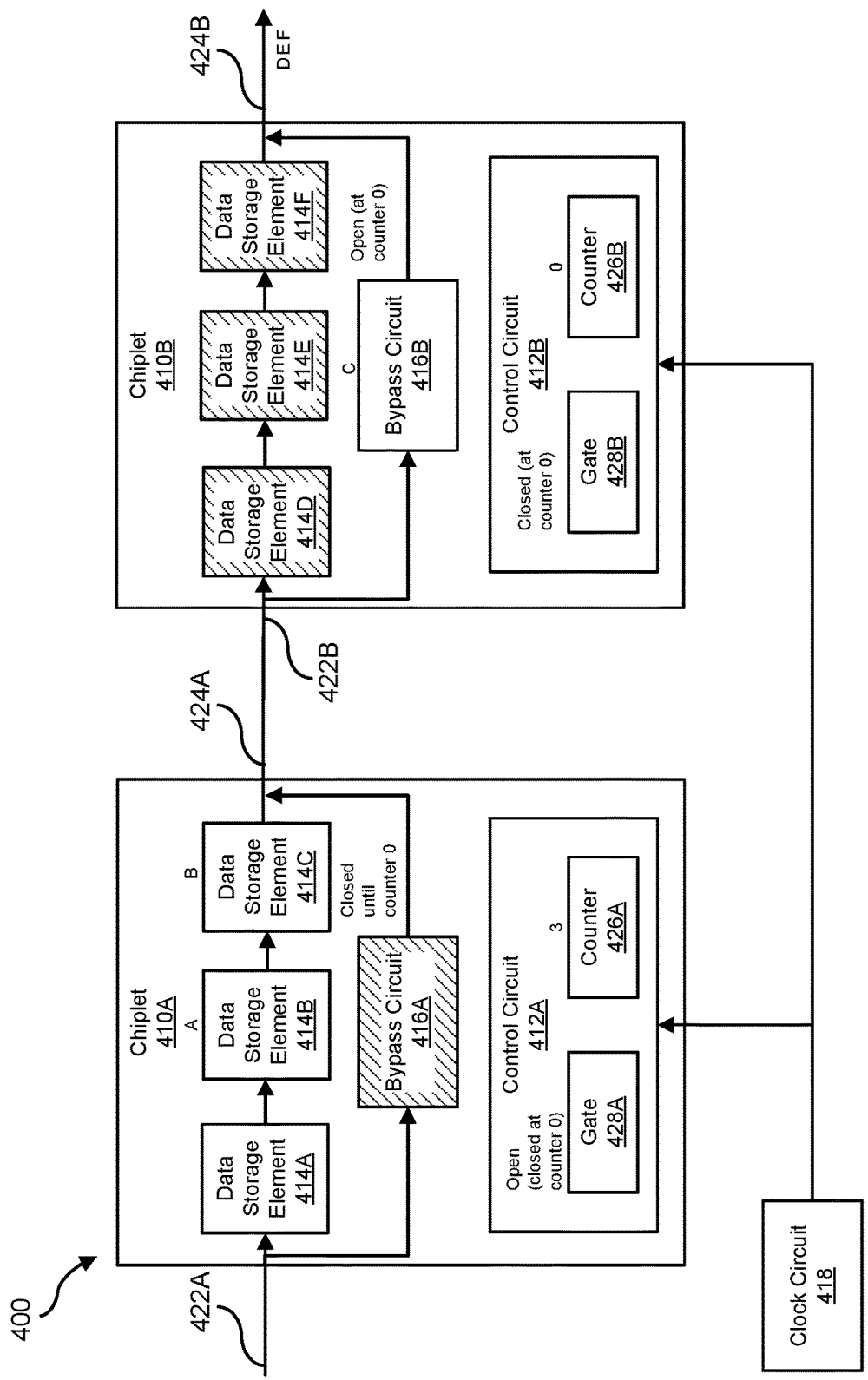

FIG. 4D illustrates a next cycle after FIG. 4C, with counter 426A and counter 426B having decremented their values (e.g., to "3" and "0," respectively). For chiplet 410B, which has now completed shifting out its data (e.g., values "F," "E," and "D" to output 424B), counter 426B has correspondingly saturated, triggering gate 428B to close (e.g., disable data storage elements 414D-414F) and enabling bypass circuit 416B (e.g., opening the output of bypass circuit 416 and also closing the output of data storage element 414F). Because of the transition cycle, bypass circuit 416B is already loaded with value "C" from a succeeding data storage element (e.g., data storage element 414C of chiplet 410A which succeeds chiplet 410B and data storage element 414D in the chain of data storage elements).

For chiplet 410A, its data storage elements can continue shifting its data until the next trigger condition (e.g., when counter 426A saturates and disables data storage elements 414A-414C and enables bypass circuit 416A). As illustrated in FIG. 4D, after the transition cycle, data storage elements of one chiplet are enabled.

Figure 4E:
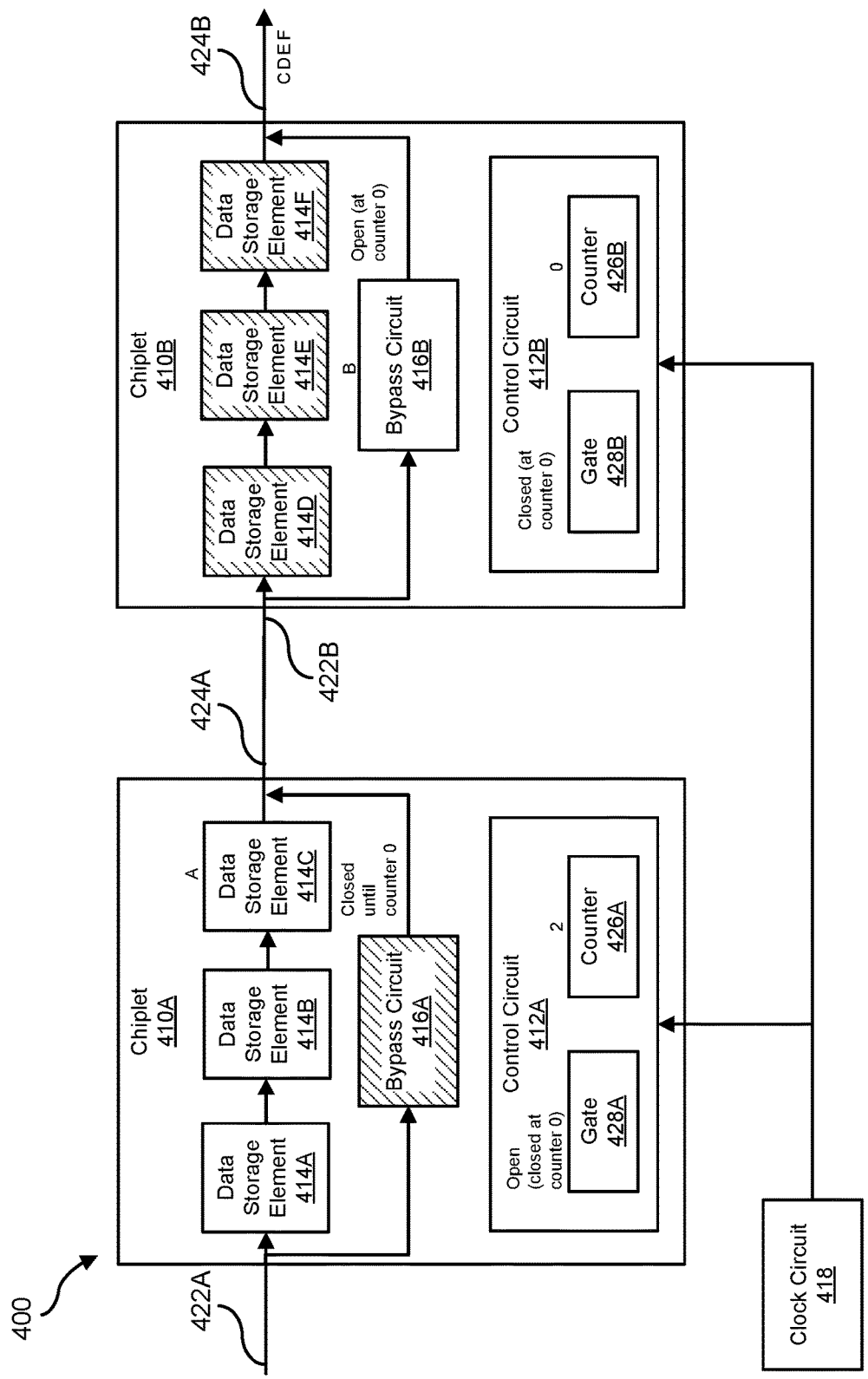

FIG. 4E illustrates a next cycle after FIG. 4D, with counter 426A having decremented its value (e.g., to "2") while counter 426B remains saturated. As counter 426B remains saturated, chiplet 410B operates with bypass circuit 416B shifting data. Although not further illustrated, chiplet 410A can operate until counter 426A saturates, at which point chiplet 410A can operate with bypass circuit 416A for shifting data, and disabling data storage elements 414A-414C. Succeeding chiplets in the chain (not illustrated), can be similarly initialized as chiplet 410A and operate with similar trigger values for their respective counters. Thus, the data is shifted out in the same order as the chain of data storage elements, without requiring the whole chain to be active for every or nearly every cycle.

Figure 5:
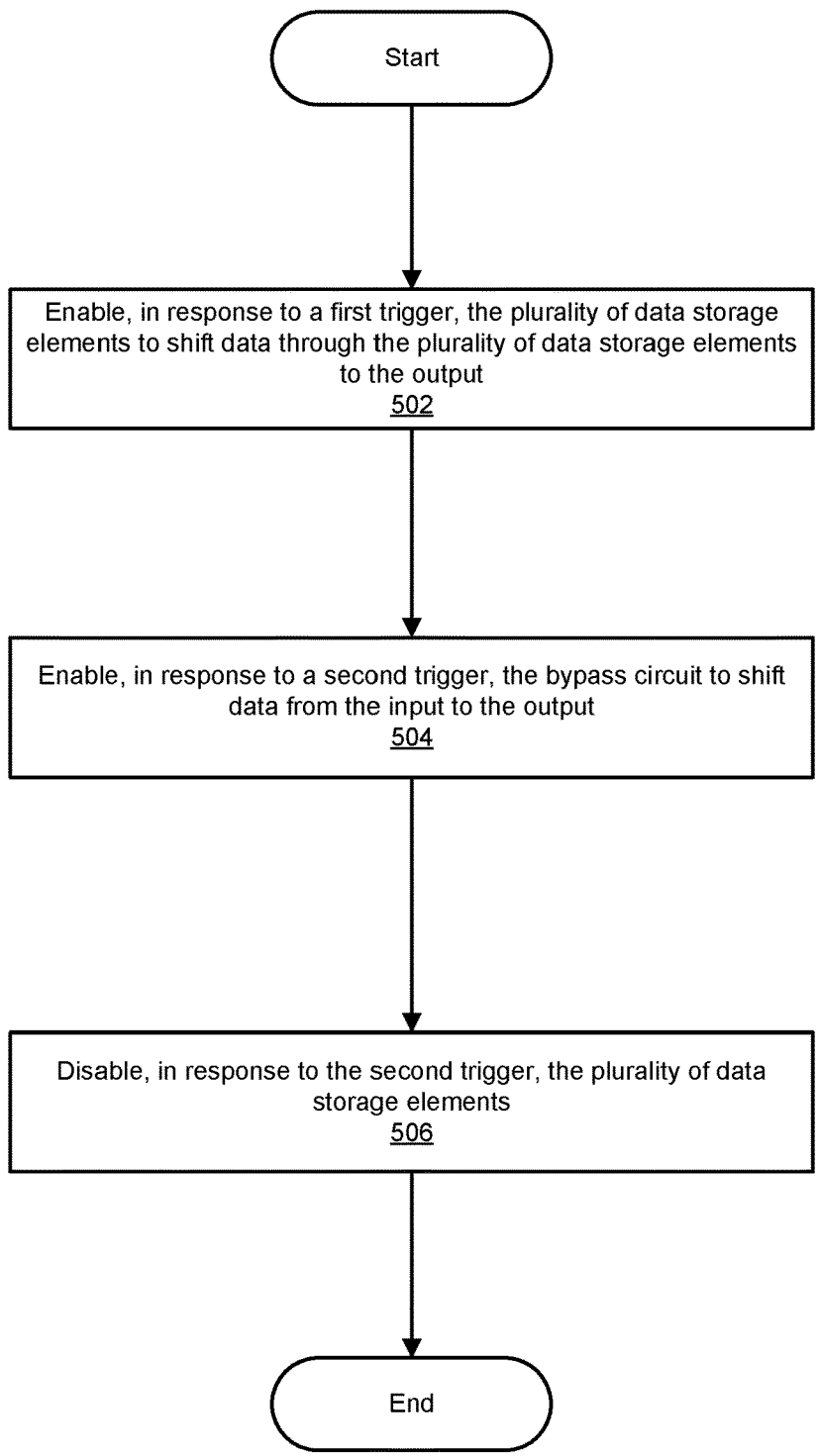
FIG. 5 is a flow diagram of an exemplary method for increased shift frequency for multi-chip-module scan.

FIG. 5 is a flow diagram of an exemplary computer-implemented method 500 for increased shift frequency for multi-chip-module scan. The steps shown in FIG. 5 can be performed by any suitable computer-executable code and/or computing system, including the system(s) illustrated in FIGS. 1, 3 and/or 4A-4E. In one example, each of the steps shown in FIG. 5 represent an algorithm whose structure includes and/or is represented by multiple sub-steps, examples of which will be provided in greater detail below.

As illustrated in FIG. 5, at step 502 one or more of the systems described herein enables, in response to a first trigger, the plurality of data storage elements to shift data through the plurality of data storage elements to the output. For example, control circuit 112 enables data storage element 114 to shift data to the output in response to a first trigger.

The systems described herein can perform step 502 in a variety of ways. In one example, control circuit 112 can initialize a counter. In some examples, initializing the counter can further include storing, for the first trigger, a first clock cycle count value corresponding to a number of data storage elements preceding the output in the chain of data storage elements and storing, for a second trigger, a second clock cycle count value corresponding to a number of data storage elements 114 in the plurality of data storage elements. In some examples, the first trigger is based on a number of data storage elements preceding the output in the chain of data storage elements.

In some examples, for each chiplet, the first trigger can be based on the counter reaching a clock cycle count value corresponding to a number of data storage elements preceding the output in the chain of data storage elements. In some examples, for each chiplet, the clock cycle count value includes a transition cycle, as described herein. During the transition cycle, bypass circuit 116 can receive data from the input and a last of the plurality of data storage elements transmits data to the output.

At step 504 one or more of the systems described herein enables, in response to a second trigger, the bypass circuit to shift data from the input to the output. For example, control circuit 112 can enable bypass circuit 116 to shift data from the input to the output.

The systems described herein can perform step 504 in a variety of ways. In one example, the second trigger can be based on a number of data storage elements 114 in the plurality of data storage elements. For example, for each chiplet, the second trigger can be based on the counter reaching a clock cycle count value corresponding to a number of data storage elements 114 in the plurality of data storage elements.

In some examples, for each chiplet, bypass circuit 116 includes a data storage element (e.g., a flop) for holding data shifted from the input to the output. In some examples, for each chiplet, bypass circuit 116 receives, via the input, data from a second portion of the chain of data storage elements succeeding the chiplet.

At step 506 one or more of the systems described herein disable, in response to the second trigger, the plurality of data storage elements. For example, control circuit 112 can disable data storage element 114 in response to the second trigger.

The systems described herein can perform step 506 in a variety of ways. In one example, for each chiplet, control circuit 112 can be configured to disable the plurality of data storage elements 114 by using the clock gate circuit to block a clock signal from clock circuit 118 to the plurality of data storage elements 114. In some examples, control circuit 112 can include or otherwise control a multiplexer for selecting (e.g., an output) between the plurality of data storage elements 114 and bypass circuit 116.

As detailed above, when a computing system hangs, there are multiple debug techniques used to determine a root cause of the failure. A scan dump operation is a common debug tool which provides a snapshot of all scan-able flops. For example, the IEEE1149.1 JTAG interface can be used for scan dump.

Modern SoCs can use advanced packing technologies like 2.5D, 3D and 3.5D to pack multiple chiplets in the package. For a multi-chip-module (MCM), the Joint Test Action Group (JTAG) interfaces of all chiplets are connected in serial fashion to shift out the single chain scan data on the JTAG test data out (TDO) pin. The JTAG test clock (TCK) is can typically be run around ~100 Mhz range. During a normal scan dump, all chiplets' scan flops are toggling which can stress the system's power grid and pose challenges to running JTAG_TCK at the targeted (~100 Mhz) speed. The systems and methods described herein advantageously provide a way to reduce power, allowing an increased scan dump frequency.

A normal power grid is designed to manage around 30-40% of SoC logic toggle at any given time. During single chain scan dump, every single flop in SoC toggles, which creates large toggle activity and high current demand. This can cause a sudden drop in the power supply voltage, called dynamic IR drop. The IR drop causes setup/hold violations which can eventually corrupt the scan dump. The systems and methods described herein provide a way to reduce toggle activity significantly during MCM single chain scan dump. The reduction in toggle activity eliminates IR drop issue.

Moreover, typical SoCs can include millions of flops. The scan dump normally runs at a slow speed (~1 Mhz) due to IR drop issues at higher speed. Thus, dumping all chiplet's content can take hours.

The systems and methods described herein can reduce overall toggle activity during an MCM scan dump. The JTAG_TCK frequency can therefore run at much higher speed as IR drop risk is eliminated by reducing toggle activity. This reduces overall scan dump time significantly and further can speed up debug time.

By generally toggling the clock of only one chiplet at a time, and clock gating all other chiplets to reduce toggle activity during scan dump, the systems and methods described herein can advantageously reduce power consumption and accordingly allow faster scan dumps. The scan dump can be used to debug the event which trigger the system hang.

The clock needs to be stopped as soon as the hang occurs, so a designer can review the flop states at the time, or very close to the time where failure occurs. The clock can be stopped in several ways, including test data register (TDR) programming after hang occurs and/or using an event-based clock stop through a cross trigger network.

After the clock stop, the scan content can be shifted out on JTAG TDO. The off-chip mapping software parse the TDO log and create the mapping for each scan flop and its value. The designer can review the snapshot of all flops to determine the root cause of the failure. The systems and methods described herein advantageously preserved the TDO log mapping and does not require any changes in the mapping software.

Inside the MCM package, multiple chiplets' JTAG interfaces are connected in serial fashion to package level JTAG pins. Accordingly, all scannable flops are connected in one long chain. To preserve the chain sequence (e.g., preserve the TDO log mapping), the systems and methods described herein provide for various additions. In one example, chiplet0 is at the tail of the JTAG chain and chiplet2 is at the head, with chiplet1 therebetween. The JTAG_TCK is used to shift out the scan content in this example.

A counter can be added in each chiplet. The size of each counter can, in some examples, be log 2 (a+b+c), where a, b, and c are a total number of scan flops in chiplet0, chiplet1, and chiplet2, respectively. For instance, if chiplet0, chiplet1, and chiplet2 have a total (e.g., a+b+c) of 10M flops, the counter size=log 2 (10000000)=24 bits. In some examples, the counters can be larger than log 2 (a+b+c), for instance allowing future expansion.

The counter can start toggling when a single chain scan shift starts. All chiplets' counters can start toggling at the same time. Using, for example a TDR, a counter_load value, for loading the counter value (e.g., corresponding to clock cycles until the counter saturates), can be used. The size of the TDR can be similar to that of the counter. This TDR value can be programmed prior to scan dump starts. For example, in chiplet0 (first in the chain), the TDR can be configured with value a, wherein a=total flops in a single chain for chiplet0. Thus, the counter in chiplet0 can saturate after "a" clock cycles.

For chiplet1 (second in the chain), the TDR can be configured with value (a+b), wherein b=total flops in a single chain for chiplet1. The counter in chiplet1 can saturate after "a+b" clock cycles.

For chiplet2 (third in the chain), the TDR can be configured with value (a+b+c), wherein c=total flops in a single chain for chiplet2. The counter in chiplet2 can saturate after "a+b+c" clock cycles.

An additional TDR, clock_enable_start, can be added to each chiplet to determine at which clock cycle a system_clock_enable signal becomes 1. When the counter reaches this clock_enable_start value, then system_clock_enable becomes 1 and remain 1 until counter saturates. This TDR (clock_enable_start) in chiplet0 can be configured with value a. Because both counter_load and clock_enable_start TDR values are the same, for chiplet0 system_clock_enable becomes 1 from the first clock cycle of single chain scan shift.

For chiplet1, this TDR (clock_enable_start) can be configured with value (b+1). The system_clock_enable for chiplet1 becomes 1 after "a-1" (e.g., (a+b)-(a-1)=a+b-a+1=b+1) clock cycles.

For chiplet2, this TDR (clock_enable_start) can be configured with value (c+1). The system_clock_enable for chiplet2 becomes 1 after "a+b-1" (e.g., (a+b+c)-(a+b-1)=a+b+c-a-b+1=c+1) clock cycles.

In addition, a clock gater can be added in each chiplet before all scan flops. The clock gater can be controlled by system_clock_enable signal generated from the counter. This clock gater can help to reduce toggle activity by clock gating chiplets which are not active.

Moreover, a bypass flop can be added to each chiplet. This bypass flop can provide a path from each chiplet's test data input (TDI) to TDO when the chiplet completes its scan dump and is clock gated. The bypass flop can be connected to a free-running TCK (e.g., not through a clock gater). After each chiplet completes its scan dump, only this flop requires the clock to provide the path to JTAG TDO.

In relation to the bypass flop, a 2:1 multiplexer can be added to each chiplet. A first input (input 0) of the multiplexer can be connected to tail of single chain of chiplet. A second input (input 1) of the multiplexer can be connected to the bypass flop output. The select line of the multiplexer can controlled by the counter. When counter saturates, the select line becomes 1 (e.g., for the bypass flop).

With the described additions, for a scan dump operation of chiplet0, chiplet1, and chiplet2, a cross trigger detects an event and stops the clock in all chiplets. The TDRs (e.g., TDR-clock_enable_start and TDR-counter_load) are configured in all chiplets as described above. The respective counter gets loaded with TDR programmed value in all chiplets as described above.

The respective counters in all chiplets start decrementing on first clock cycle of single chain shift. Specifically, chiplet0 is connected to JTAG TDO pin. The data from chiplet0 starts shifting out on JTAG TDO while other chiplets flops are still clock gated. When the counter for chiplet1 reaches b+1 value, the chiplet1 clock gater opens (e.g., for a transition cycle). The last scan flop data from chiplet1 is shifted to the bypass flop in chiplet0. When the counter for chiplet0 reach 0 value (e.g., saturates), the chiplet0 clock gater is close and clock is gated (e.g., disabling the flops for chiplet0).

The counter saturate signal switches the multiplexer select like from 0→1 such that the JTAG TDO is now driven by the bypass flop of chiplet0. One clock cycle before counter for chiplet0 saturates, the last bit from chiplet1 is shifted to bypass flop in chiplet0. Hence, the data shifted to JTAG TDO does not have any extra buffering while switching from one chiplet to a succeeding chiplet. Thus, any offline parsing software does not require any changes as the scan data coming on TDO retains the same mapping.

When the counter for chiplet2 reaches c+1 value, the chiplet2 clock gater opens. The last scan flop data from chiplet2 is shifted to bypass flop in chiplet1. When the counter for chiplet1 counter reaches 0 value, the chiplet1 clock gater is closed and clock is gated. The counter saturate signal switches the multiplexer select for chiplet1 from 0→1. One clock cycle before the counter for chiplet1 saturates, the last bit from chiplet2 is shifted to bypass flop in chiplet1. This process can continue until all chiplets' scan data are shifted out to TDO.

Thus, the systems and methods described herein can advantageously eliminate an IR drop issue during scan dump. This scalable solution can work for any number of chiplets inside the MCM package. A scan dump can run, in some examples, 100× faster (e.g., 1 Mhz→100 Mhz.)

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
    an input and an output;
    a plurality of data storage elements serially connected between the input and the output and comprising a portion of a chain of data storage elements;
    a bypass circuit coupled to the input and the output; and
    a control circuit configured to:
        enable, in response to a first trigger that corresponds to the portion of the chain of data storage elements initiating a data dump, the plurality of data storage elements to shift data through the plurality of data storage elements to the output;
        enable, in response to a second trigger that corresponds to the portion of the chain of data storage elements having completed the data dump, the bypass circuit to shift data from the input to the output; and
        disable, in response to the second trigger, the plurality of data storage elements.

2. The device of claim 1, wherein the first trigger is based on a number of data storage elements preceding the output in the chain of data storage elements.

3. The device of claim 1, wherein the second trigger is based on a number of data storage elements in the plurality of data storage elements.

4. The device of claim 1, wherein the control circuit comprises a multiplexer for selecting between the plurality of data storage elements and the bypass circuit.

5. The device of claim 1, wherein the bypass circuit comprises a data storage element for holding data shifted from the input to the output.

6. A system comprising:
    a clock circuit for timing clock cycles; and
    a plurality of chiplets, each chiplet comprising:
        an input and an output, the chiplet coupled to at least one other chiplet via the input or the output;

a plurality of data storage elements serially connected between the input and the output;

a bypass circuit coupled to the input and the output; and a control circuit configured to:

enable, in response to a first trigger, the plurality of data storage elements to shift data through the plurality of data storage elements to the output based on clock cycles;

enable, in response to a second trigger, the bypass circuit to shift data from the input to the output based on the clock cycles; and disable, in response to the second trigger, the plurality of data storage elements;

wherein:

a chain of data storage elements comprises each plurality of data storage elements of each of the plurality of chiplets-;

the first trigger corresponds to the corresponding portion of the chain of data storage elements initiating a data dump; and the second trigger corresponds to the corresponding portion of the chain of data storage elements having completed the data dump.

7. The system of claim 6, wherein for each chiplet, the control circuit comprises a counter for tracking the clock cycles from a start of a scan dump.

8. The system of claim 7, wherein for each chiplet, the first trigger is based on the counter reaching a clock cycle count value corresponding to a number of data storage elements preceding the output in the chain of data storage elements.

9. The system of claim 8, wherein for each chiplet, the clock cycle count value includes a transition cycle.

10. The system of claim 9, wherein for each chiplet, during the transition cycle the bypass circuit receives data from the input and a last of the plurality of data storage elements transmits data to the output.

11. The system of claim 7, wherein for each chiplet, the second trigger is based on the counter reaching a clock cycle count value corresponding to a number of data storage elements in the plurality of data storage elements.

12. The system of claim 6, wherein for each chiplet, the control circuit comprises a clock gate circuit.

13. The system of claim 12, wherein for each chiplet, the control circuit is configured to disable the plurality of data storage elements by using the clock gate circuit to block a clock signal from the clock circuit to the plurality of data storage elements.

14. The system of claim 6, wherein for each chiplet, the control circuit comprises a multiplexer for selecting between the plurality of data storage elements and the bypass circuit.

15. The system of claim 6, wherein for each chiplet, the bypass circuit comprises a data storage element for holding data shifted from the input to the output.

16. The system of claim 6, wherein for each chiplet, the bypass circuit receives, via the input, data from a second portion of the chain of data storage elements succeeding the chiplet.

17. A method for performing a scan dump, comprising:

initializing a counter of a chiplet that includes a plurality of data storage elements comprising a portion of a chain of data storage elements;

enabling, in response to a first trigger that corresponds to the portion of the chain of data storage elements initiating a data dump, the plurality of data storage elements of the chiplet to shift data through the plurality of data storage elements to an output of the chiplet, wherein the plurality of data storage elements are serially connected between an input of the chiplet and the output;

receiving, via a bypass circuit of the chiplet connected to the input and the output, data from the input;

enabling, in response to a second trigger that corresponds to the portion of the chain of data storage elements having completed the data dump, the bypass circuit to shift data from the input to the output; and disabling, in response to the second trigger, the plurality of data storage elements.

18. The method of claim 17, wherein initializing the counter further comprises storing, for the first trigger, a first clock cycle count value corresponding to a number of data storage elements preceding the output in the chain of data storage elements and storing, for the second trigger, a second clock cycle count value corresponding to a number of data storage elements in the plurality of data storage elements.

19. The method of claim 17, wherein receiving, via the bypass circuit, the data from the input further comprises receiving, from a second portion of the chain of data storage elements succeeding the chiplet, the data from the input.

20. The method of claim 17, wherein receiving, via the bypass circuit, the data from the input further comprises receiving, during a transition cycle, the data from the input.

* * * * *